United States Patent
Melnyk et al.

(10) Patent No.: US 9,894,361 B2
(45) Date of Patent: Feb. 13, 2018

(54) FRAMEWORK FOR QUALITY-AWARE VIDEO OPTIMIZATION

(75) Inventors: Miguel Melnyk, Champaign, IL (US); Andrew Penner, Champaign, IL (US); Jeremy Tidemann, Champaign, IL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1038 days.

(21) Appl. No.: 12/751,951

(22) Filed: Mar. 31, 2010

(65) Prior Publication Data

US 2010/0254451 A1 Oct. 7, 2010

Related U.S. Application Data

(60) Provisional application No. 61/165,224, filed on Mar. 31, 2009.

(51) Int. Cl.
| | |
|---|---|
| *H04N 19/124* | (2014.01) |
| *H04N 19/152* | (2014.01) |
| *H04N 19/154* | (2014.01) |
| *H04N 19/172* | (2014.01) |
| *H04N 19/40* | (2014.01) |
| *H04N 19/46* | (2014.01) |
| *H04N 19/176* | (2014.01) |

(Continued)

(52) U.S. Cl.
CPC ........ *H04N 19/124* (2014.11); *H04N 19/152* (2014.11); *H04N 19/154* (2014.11); *H04N 19/172* (2014.11); *H04N 19/40* (2014.11); *H04N 19/46* (2014.11)

(58) Field of Classification Search
USPC ..................... 375/240.03; 3/240.03
See application file for complete search history.

(56) References Cited

U.S. PATENT DOCUMENTS 6,661,927 B1 * 12/2003 Suarez ................. H04N 19/63
 375/240.11
2002/0110193 A1 8/2002 Yoo et al.
(Continued)

FOREIGN PATENT DOCUMENTS

CN 1235428 A 11/1999
CN 1631041 A 6/2005
(Continued)

OTHER PUBLICATIONS

Bibliographic information for Japanese Publication No. JP 2011514056, published Apr. 28, 2011 for Qualcomm, Inc. (2 pgs).
(Continued)

*Primary Examiner* — Obafemi Sosanya
(74) *Attorney, Agent, or Firm* — Foley & Lardner LLP; Christopher J. McKenna (57) ABSTRACT

A computer-implemented method includes receiving an encoded video frame, decompressing the received encoded video frame, extracting a first quantization parameter (QP) from the decompressed video frame, and acquiring a delta QP based on the first QP. The method also includes acquiring a second QP based on the delta QP and the first QP, compressing the decompressed video frame based on the second QP, and providing the compressed video frame. The first QP corresponds to quantization settings originally used for compressing the encoded video frame. And the second QP corresponds to quantization settings for compressing the decompressed video frame.

25 Claims, 9 Drawing Sheets

(51) Int. Cl.
*H04N 19/63* (2014.01)
*H04N 19/147* (2014.01)
*H04N 19/139* (2014.01)

(56) References Cited

U.S. PATENT DOCUMENTS

| | | |
|---|---|---|
| 2002/0181595 A1 | 12/2002 | Obata et al. |
| 2003/0095594 A1 | 5/2003 | Laksono et al. |
| 2004/0141732 A1 | 7/2004 | Sugiyama et al. |
| 2005/0152449 A1 | 7/2005 | Nemiroff |
| 2005/0220188 A1* | 10/2005 | Wang .............. H04N 19/147 375/240.03 |
| 2005/0232354 A1* | 10/2005 | Chen .............. H04N 19/139 375/240.16 |
| 2008/0065965 A1 | 3/2008 | Hannuksela |
| 2009/0106356 A1 | 4/2009 | Brase et al. |
| 2009/0213930 A1 | 8/2009 | Ye et al. |
| 2009/0232220 A1 | 9/2009 | Neff et al. |
| 2010/0061448 A1 | 3/2010 | Zhou et al. |
| 2010/0166060 A1* | 7/2010 | Ezure .............. H04N 19/176 375/240.03 |
| 2011/0090953 A1 | 4/2011 | Melnyk et al. |
| 2012/0314764 A1 | 12/2012 | Tidemann et al. |

FOREIGN PATENT DOCUMENTS

| | | |
|---|---|---|
| EP | 1727371 A1 | 11/2006 |
| EP | 2061241 A1 | 5/2009 |
| WO | WO 97/37322 | 10/1997 |
| WO | WO 2008/098249 | 8/2008 |
| WO | WO 2009/105732 | 8/2009 |
| WO | WO 2010/117432 A2 | 10/2010 |

OTHER PUBLICATIONS

Sullivan, G.J., et al., "Rate-Distortion Optimization for Video Compression," IEEE Signal Processing Magazine, vol. 15, No. 6, Nov. 1, 1998, pp. 74-90 XP011089821.

PCT Notification of Transmittal of the International Search Report and Written Opinion of the International Searching Authority for International Application No. PCT/US2010/000988, dated Nov. 19, 2010, 24 pages.

Communication pursuant to Article 94(3) EPC for European Application No. 10713807.5, dated Oct. 26, 2012, 7 pgs.

Al-Khrayshah, M., "A Real-Time SNR Scalable Transcoder for MPEG-2 Video Streams," Eindhoven University of Technology, Master Informatica Computer Science Engineering (CSE) Afstudeerverslagen; Jan. 1, 2009, pp. 1-80.

English translation and First Chinese Office Action for Application No. 201080057336.1 dated Feb. 12, 2015; 33 pages.

English translation and Second Chinese Office Action for Application No. 201080057336.1 dated Sep. 23, 2015; 31 pages.

English translation and First Chinese Office Action for Application No. 201280039090.4 dated Aug. 1, 2016; 25 pages.

International Search Report and the Written Opinion for International Application No. PCT/US2010/002762, dated May 19, 2011, 18 pgs.

International Preliminary Report on Patentability for International Application No. PCT/US2010/002762, dated Apr. 26, 2012, 10 pgs.

International Search Report and the Written Opinion for International Application No. PCT/US2012/041691, dated Oct. 5, 2012, 20 pages.

Lei, Z, et al. "Rate Adaptation Transcoding for Precoded Video Streams," ACM 2002, Dec. 1, 2002-Dec. 6, 2002, pp. 127-135.

Nakajima, Y, et al., "Rate Conversion of MPEG Coded Video by Re-Quantization Process," Proceedings of the International Conference on Image Processing (ICIP), Washington, D.C., Oct. 23-26, 1995, IEEE Comp. Soc. Press, US, vol. 3, Oct. 23, 1995, pp. 408-411.

Puri, A, et al. "Motion-Compensated Video Coding with Adaptive Perceptual Quantization," IEEE Transactions on Circuits and Systems for Video Technology, IEEE Service Center, vol. 1, No. 4, Dec. 1, 1991, pp. 351-361.

Summons to Attend Oral Proceedings for European Application No. 10776446.6; mailed Sep. 22, 2016; 7 pages.

* cited by examiner

FRAMEWORK FOR QUALITY-AWARE VIDEO OPTIMIZATION

CROSS REFERENCE TO RELATED PATENTS

This application claims the priority and benefit of U.S. Provisional Application No. 61/165,224, filed on Mar. 31, 2009, titled "A Framework for Quality-Aware Video Optimization," the entire contents of which are incorporated herein by reference.

BACKGROUND INFORMATION

Quantization Vs. Perceptual Quality

In video processing, quantization is a lossy compression technique achieved by compressing a range of values to a single quantum value. When a video frame is quantized in any system, information is lost. For example, typical video encoders (e.g., MPEG-2) can compress video frames by discarding information that does not contribute to the reconstruction of an image representative of the original image during decoding. The amount of information discarded during encoding depends on how each video frame is quantized. Each video compression format defines a discrete set of quantization settings, and each quantization setting has an abstract identifier, denoted as a quantization parameter (QP). The QP can be arbitrarily defined as, for example, an integer that indexes an array of quantization settings such that quantization noise introduced by a smaller QP value of X is less than the quantization noise introduced by a larger QP value of X+1. The quantization settings indexed by a given QP value can be different for each video codec.

If too much information is discarded during quantization, the video frame may appear distorted when it is decompressed during playback. This captures the relationship between quantization and perceptual quality. Thus, the QP may be used as an indicator of perceptual quality since the QP indicates how much information is discarded when encoding a video frame.

To illustrate that the QP is only a heuristic for estimating the video frame's perceptual quality, one should consider a "low quality" video frame quantized with fine quantization settings. If a video frame is encoded with fine quantization settings—meaning very little information is discarded—the video frame reconstructed by the decoder will very closely match the original video frame. The quantization noise in the reconstructed video frame is very low, but the reconstructed video frame still appears to be low quality since the original video frame was of low quality. This is just one example where the QP does not accurately indicate the perceptual quality of the video.

Quantization Vs. Bitrate

Figure 3:
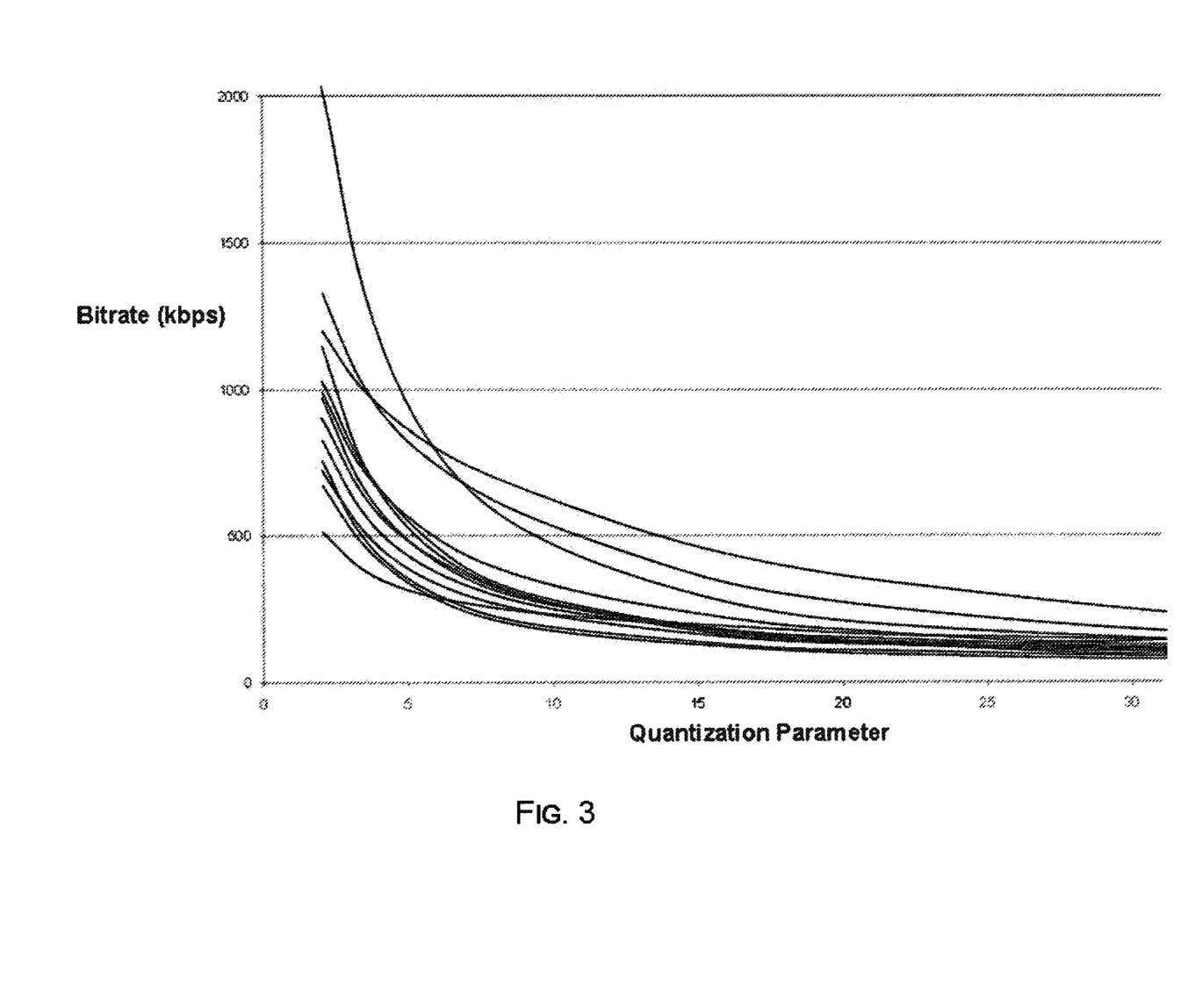
FIG. 3 illustrates exemplary correlation between bitrate and QP for various video frame sequences.

In video processing, bitrate refers to a number of bits used per unit of playback time to represent a continuous video after encoding (data compression). Different images or video frames can naturally require a different number of bits to be represented even when they share the same pixel dimensions and are encoded with the same QP. The relationship between QP and compressed byte size for a given video frame, however, is more predictable. If a higher QP value represents a coarser quantization (more information loss), then a frame quantized with a higher QP value of X+1 will never require more bits than the same frame quantized with a smaller QP value of X (this ignores corner cases in the entropy coding schemes usually applied to quantized coefficient data). In practice, this means that average bitrate requirement of frames decreases when the QP used to quantize them is increased. FIG. 3 shows how the bitrate of a video sequence decreases as the QP increases. The bitrate numbers and the QP values in FIG. 3 are just examples. In real life, the numbers and the values can be different and correlation between QP values and bitrate can vary for different video sequences.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Exemplary embodiments disclosed herein are directed to methods and systems for quality-aware video optimization. Quality-aware video optimization is a technique to modify a video frame sequence so that the byte size of video stream is reduced as much as possible, while simultaneously limiting the perceptual quality degradation to a controllable level. The quality-aware video optimization technique can require only a single pass over the previously encoded video frame sequence in order to optimize the video frame sequence. A problem with existing single-pass rate control techniques is that the relationship between the compressed bytes size of a video frame and its quantization parameter is only known after the frame is encoded. To achieve byte reduction and controllable quality degradation in a single pass, a quality-aware video optimizer can refer to information about how video frames were quantized during their initial encoding and use the information to optimize the video frame sequence.

A framework for quality-aware video optimization can adjust image quantization, allowing, through empirical testing, the fine control of the quality degradation in the byte-reduced content. Through further empirical testing, it is also possible to apply the quantization adjustment optimizations to transcoding scenarios, where the input and output compression formats are different.

Figure 1:
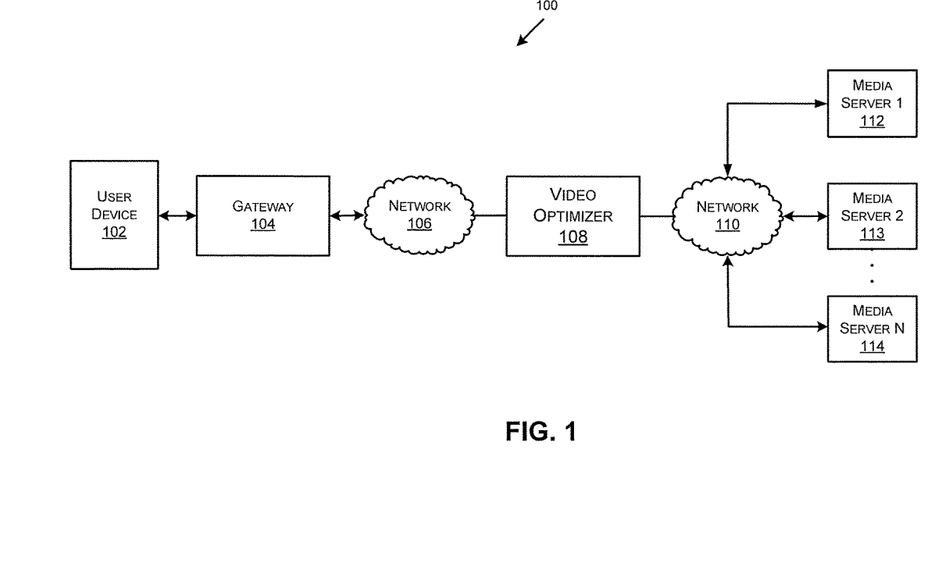
FIG. 1 illustrates a block diagram of an exemplary system.

FIG. 1 illustrates a block diagram of an exemplary system 100. Exemplary system 100 may be any type of system that provides video content over a local connection or a network, such as a wireless network, Internet, broadcast network, etc. Exemplary system 100 may include, among other things, a user device 102, a gateway 104, one or more networks 106 and 110, a video optimizer 108, and one or more media servers 112-114.

User devices 102 can be a hardware device such as a computer, a PDA, a cell phone, a laptop, a desktop, a VCR, a Laserdisc player, a DVD player, blue ray disc player, a television set including a broadcast tuner, or any electronic device capable of accessing a data network and/or capable of playing video. User device 102 can include software applications that allow user device 102 to communicate with and receive video content from a data network, e.g., network 106. For example, user device 102 may send request data to a media server to download a particular video streaming file, and the media server can transmit the video streaming file to user device 102. In some embodiments, the video streaming file may be routed through video optimizer 108. User device 102 may provide a display and one or more software applications, such as a media player, for displaying the video stream to a user of the user device.

In some embodiments, user device 102 can also be or include a storage device for storing or archiving video content. For example, the storage device can be provided as a video CD, DVD, Blu-ray disc, hard disk, magnetic tape, flash memory card/drive, volatile or non-volatile memory, holographic data storage, and any other storage medium.

Gateway 104 is one or more devices that serve as an entrance or a means of access and may or may not convert formatted data provided in one type of network to a particular format required for another type of network. Gateway 104, for example, may be a server, a router, a firewall server, a host, or a video optimizer. For example, gateway 104 may have the ability to transform signals received from user device 102 into signals that network 106 or 110 can understand and vice versa. This transforming ability, however, is not required in some data network, for example, Fourth-Generation (4G) or Worldwide Interoperability for Microwave Access (WiMAX). Gateway 104 may be capable of processing audio, video, and T.120 transmissions alone or in any combination, and is capable of full duplex media translations. Further, gateway 104 can include video optimizer 108 for quality-aware video optimization.

Networks 106 and 110 may include any combination of wide area networks (WANs), local area networks (LANs), or wireless networks suitable for packet-type communications, such as Internet communications, or broadcast networks suitable for distributing video content.

Video optimizer 108 can be implemented as a software program and/or hardware device that provides quality-aware video optimization. Video optimizer 108 is a server that provides communication between user device 102 and media servers 112-114. Video optimizer 108 can perform single-pass, on-the-fly, quality-aware optimization to a previously encoded video frame sequence, as described below. Since the video optimization method only requires one pass over the video frame sequence, video optimizer 108 is well suited to operate in a wide variety of environments. For example, video optimizer 108 can be part of any of the media servers 112-114, or any network device between user device 102 and media servers 112-114. In this way, video optimizer 108 optimizes live video feeds before they traverse a low-capacity network segment. Also, video optimizer 108 can also be installed in front of a storage array to optimize surveillance video before it is archived, and thus saves storage space.

Media servers 112-114 can be computer servers that receive a request for video content from user device 102, process the request, and provide video content to user device 102 through, in some embodiments, video optimizer 108. For example, media servers 112-114 can be web servers, enterprise servers, or any other type of computer servers. Media servers 112-114 can be computers programmed to accept requests (e.g., HTTP, RTSP, or other protocols that can initiate a video session) from user device 102 and to serve user device 102 with video stream. Also, media servers 112-114 can be PDAs, cell phones, laptops, desktops, or any devices configured to transfer video content to user device 102 through, in some embodiments, one or more networks 106 and 110. In addition, media servers 112-114 can be broadcasting facilities, such as free-to-air, cable, satellite, and other broadcasting facilities, for distributing video content to user device 102 through, in some embodiments, video optimizer 108. Further, media servers 112-114 can be video sources, such as surveillance devices configured to capture videos and transfer the captured videos to user device 102 through, in some embodiments, video optimizer 108. Also, as an alternative to the configuration of system 100 shown in FIG. 1, any of media servers 112-114 can include video optimizer 108 for quality-aware video optimization.

Figure 2:
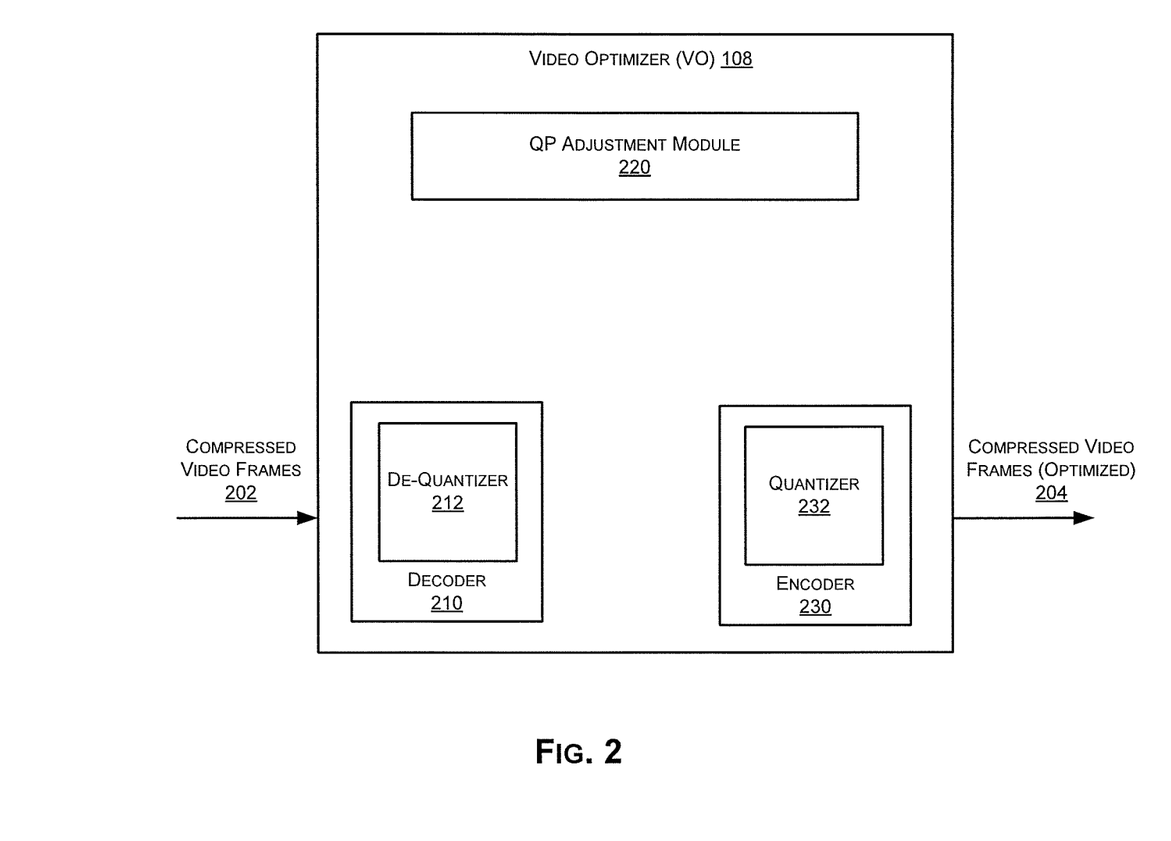
FIG. 2 is a block diagram illustrating an embodiment of an exemplary quality-aware video optimizer in the exemplary system of FIG. 1.

FIG. 2 is a block diagram illustrating an embodiment of an exemplary quality-aware video optimizer 108 in the exemplary system of FIG. 1. For simplicity, FIG. 2 only illustrates a video optimizer 108, compressed video frames as input (202), and optimized-compressed video frames as output (204). Video optimizer 108 may include, among other things, a decoder 210, a QP adjustment module 220, and an encoder 230. The illustrated configuration of video optimizer 108 is exemplary only, and can be modified to provide discrete elements or combine multiple elements into a single one, and be provided as any combination of hardware and software components.

With reference to FIG. 2, decoder 210 can be a software program and/or a hardware device that intercepts and decodes (decompresses) the incoming compressed video frames. Each incoming compressed video frame can include, among other things, a header and compressed frame video. The header can include, among other things, an input QP ($QP_{Input}$) having been used for compressing the frame.

Decoder 210 can include, among other things, a de-quantizer 212. For each decompressed video frame, de-quantizer 212 can extract $QP_{Input}$ from the decompressed video frame, and forward the $QP_{Input}$ to QP adjustment module 220. Decoder 210 can then transfer the decompressed video frame to encoder 230. In some embodiments, the decompressed video frame can be stored in a database, for example, a buffer or a queue. Also, as an alternative to the configuration of video optimizer 108 shown in FIG. 2, de-quantizer 212 can be located external to decoder 210.

Quality-Aware Video Optimization: QP Adjustment

QP adjustment module 220 can be a software program and/or a hardware device for deriving, based on the $QP_{Input}$, an output QP ($QP_{Output}$) used for compressing the decompressed video frame. As previously explained, since a relationship can be established between a QP value and perceptual quality of a video frame, and also between a QP and a bitrate of video frame, QP adjustment module 220 can use the difference ($\Delta QP$) between the $QP_{Input}$ and the $QP_{Output}$ to simultaneously control the bitrate reduction and perceptual quality degradation of an output video frame of the optimized-compressed video frames (204).

The parameter $\Delta QP$ can be defined as, for example:

$$QP_{Input} + \Delta QP = QP_{Output}$$

where $QP_{Input}$ is the quantization parameter used when an input (compressed) video frame (202) was originally encoded and $QP_{Output}$ is the quantization parameter derived by QP adjustment module 220 for use when re-quantizing the decompressed frame. For each input video frame, $QP_{Input}$ and the compressed byte size are known. QP adjustment module 220 can choose a $\Delta QP$ value to derive a $QP_{Output}$ used for quantizing the output video frame that can satisfy the requirement of byte size reduction and preserve the original perceptual quality. The smaller the $\Delta QP$ value is, the smaller the $QP_{Output}$ value is, and thus less information will be discarded during encoding—less degradation of perceptual quality. On the contrary, the larger the $\Delta QP$ value is, the larger the $QP_{Output}$ value is, and thus more information will be discarded during encoding—more degradation of perceptual quality.

Two properties of the QP vs. bitrate curve shown in FIG. 3 can be exploited to achieve optimization for an input video frame. The first property to exploit is the fact that a small $\Delta QP$ has little impact on bitrate when the $QP_{Input}$ is high. This is shown on the rightmost, flat part of the curves in FIG. 3. Quantizing a video frame with a high $QP_{Output}$ value discards more information from the original video frame. To maintain the original perceptual quality of the video frame, a high $QP_{Output}$ value cannot be used. This contradicts the goal of reducing the byte size, because when $QP_{Output}$ is less than $QP_{Input}$, the byte size of the frame can only increase. Given the shape of the QP vs. bitrate curve in FIG. 3, when $QP_{Input}$ is high, a negative $\Delta QP$ can be used to derive a relatively small $QP_{Output}$ that discards less information and maintains perceptual quality, while only increasing the byte size by a small amount.

The second property to exploit is that a small $\Delta QP$ has a large impact on bitrate when the $QP_{Input}$ is low. This is shown on the leftmost, steep part of the curves in FIG. 3. When $QP_{Input}$ is low, even a small positive $\Delta QP$ will result in large byte Reduction—discards a significant amount of information during encoding.

These observations lead to a novel function, F, defining $\Delta QP$ according to the value of $QP_{Input}$. This relationship between $\Delta QP$ and $QP_{Input}$ can be written as, for example:

$$\Delta QP = F(QP_{Input})$$

The function F can be empirically derived according to the observations described above along with perceptual analysis of real video sources. The function F can be, among other things, for example, a mapping table between $QP_{Input}$ and $\Delta QP$. The function F can also be derived from a database containing, for example, a mapping between $QP_{Input}$ and $\Delta QP$.

Referring back to FIG. 2, QP adjustment module 220 can utilize the function F to acquire $\Delta QP$, and in turn use $\Delta QP$ to derive $QP_{Output}$ used for quantizing the decompressed video frame. For example, when the $QP_{Input}$ is low or below a predetermined threshold, QP adjustment module 220 can select a positive $\Delta QP$. The positive $\Delta QP$ can yield substantial byte savings when re-quantizing high quality frames. Based on the positive $\Delta QP$, QP adjustment module 220 can derive a $QP_{Output}$ value higher than the $QP_{Input}$ to reduce the byte size substantially while decreasing the original perceptual quality of the high quality input video frame marginally. On the other hand, when the $QP_{Input}$ is high or above a predetermined threshold—a significant amount of information is discarded during original compression of an input video frame, QP adjustment module 220 can select a negative $\Delta QP$. Based on the negative $\Delta QP$, QP adjustment module 220 can derive a $QP_{Output}$ value lower than the $QP_{Input}$ to retain the original perceptual quality of the input video frame, while only inflating the byte size marginally. When a normal video frame sequence (202) including frames of various qualities is optimized with this method, the net byte reduction can be positive.

Quality-Aware Video Optimization: Controlling Quality Degradation

Figure 4:
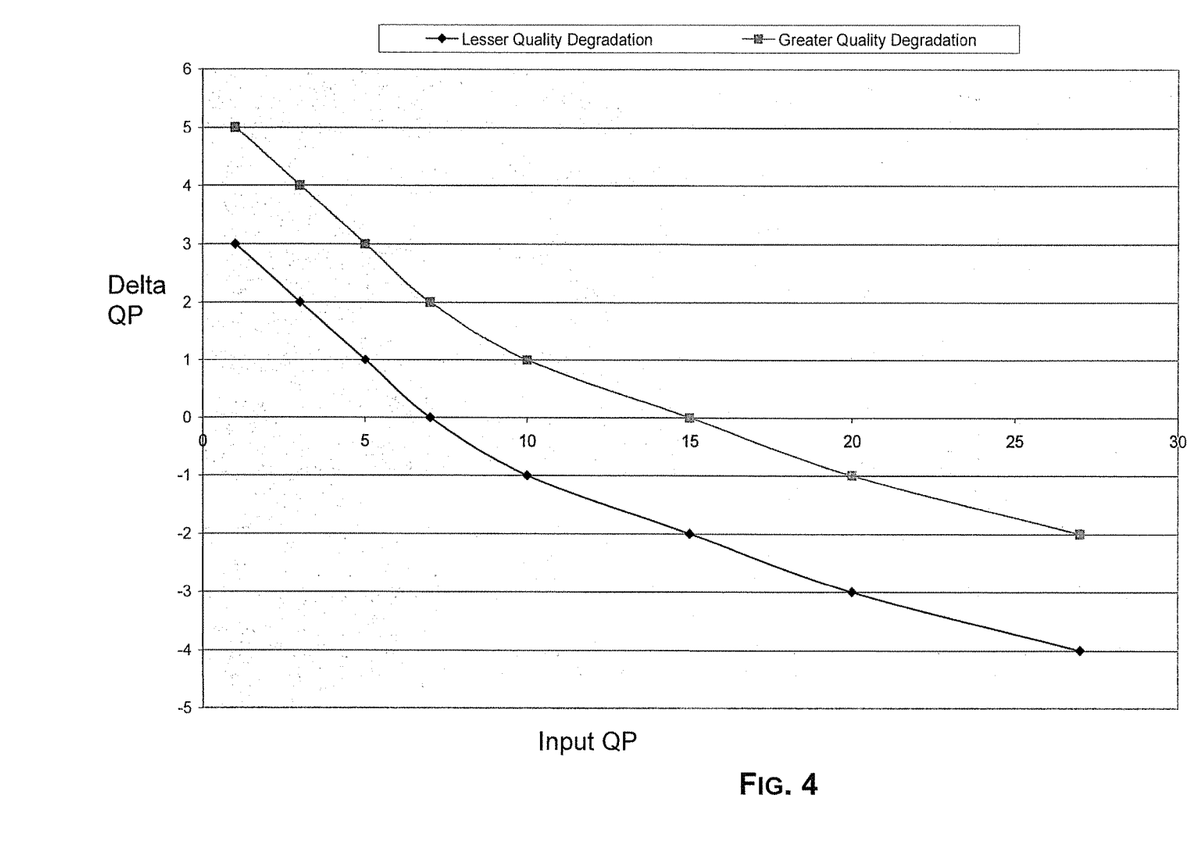
FIG. 4 illustrates exemplary mappings from $QP_{Input}$ to $\Delta QP$.

In some embodiments, QP adjustment module 220 can also acquire a quality degradation offset, which is a parameter indicating an amount of quality degradation, to control quality degradation during the optimization of the decompressed video frame. Quality degradation can be observed from a mapping between $QP_{Input}$ and the $\Delta QP$ value used for re-quantizing a video frame. FIG. 4 shows two exemplary mappings between $QP_{Input}$ and $\Delta QP$. The values of $\Delta QP$ and $QP_{Input}$ in FIG. 4 are just examples. In real life, the values can be different and mappings between $QP_{Input}$ and the $\Delta QP$ can vary for different video sequences. In FIG. 4, the higher curve yields more quality degradation because a higher $\Delta QP$ means that more information is discarded when re-quantizing the frame.

Referring back to FIG. 2, QP adjustment module 220 can add a quality degradation offset to the $\Delta QP$ to adjust the constant quality degradation introduced during optimization. For example, QP adjustment module 220 can utilize the following revised function to acquire the $\Delta QP$:

$$\Delta QP = F(QP_{Input}) + D$$

As described above, F is a function disclosing correlation between $QP_{Input}$ and $\Delta QP$. The quality degradation offset D is a parameter indicating the amount of quality degradation. The parameter can be obtained based on, among other things, for example, historical data analysis of optimized video. If quality degradation is introduced during optimization is to be minimized, a default value of the quality degradation offset D can be set to zero. QP adjustment module 220 can obtain the quality degradation offset, for example, from a database containing, e.g., historical data analysis of optimized videos. Based on the $QP_{Input}$ and the quality degradation offset, QP adjustment module 220 can derive $\Delta QP$. QP adjustment module 220 can then use $\Delta QP$ to calculate $QP_{Output}$ corresponding to $QP_{Input}$.

Quality-Aware Video Optimization: Mapping Quantization Parameters Between Codecs In some embodiments, QP adjustment module 220 can also take into consideration of the differences between an arbitrary combination of input and output compression formats (codecs), and compute codec adjustment that accounts for difference between the input and output compression formats (codecs). The quantization setting indicated by a given QP may be different for each video codec. An equivalent or corresponding quantization setting for two different video codecs, rendering the same perceptual quality, may be represented by two different QP values with difference scales. For example, a quantization setting for a video frame in codec A is represented by a QP value 20, and an corresponding quantization setting in codec B may be represented by a QP value 15. To obtain the quantization setting in codec B corresponding to the one in codec A represented by a QP value (e.g., 20), QP adjustment module 220 can convert the QP value (e.g., 20) from QP scale in codec A to the QP scale in codec B, and get a converted QP value (e.g., 15). By having this functionality, quality-aware video optimizer 108 can provide optimization benefit in any transcoding scenario.

If a compression format (codec) of an input (compressed) video frame (202) detected by decoder 210 is different from that used by encoder 230 for compressing the decompressed video frame, QP adjustment module 220 can convert $QP_{Input}$ from the decoder's QP scale to the encoder's QP scale before a ΔQP can be computed. This can be done, for example, by maintaining a mapping between QP scales for each combination of decoder and encoder that the quality-aware video optimizer supports. For example, a mapping between QP scales relates all QPs from codec A to those of codec B such that a video frame encoded with codec A can yield the same perceptual quality when encoded with codec B. These mappings can be determined experimentally, and can be implemented by QP adjustment module 220 in the QP adjustment step. If the input codec is the same as the output codec, the $QP_{input}$ may not be converted or the converted $QP_{Input}$ is the same as the $QP_{Input}$.

Based on the converted $QP_{Input}$, the quality degradation offset, QP adjustment module 220 can derive ΔQP. Alternatively, QP adjustment module 220 can obtain codec adjustment accounting for differences between input and output compression formats (codecs) based on a determination whether the input and output compression formats are the same. Based on the $QP_{Input}$, codec adjustment, and the quality degradation offset, QP adjustment module 220 can compute ΔQP. QP adjustment module 220 can then calculate $QP_{Output}$ based on ΔQP, and forward $QP_{Output}$ to encoder 230.

Encoder 230 can be a software program and/or a hardware device that receives decompressed video frames and encodes (compresses) the video frames. Encoder 230 can include, among other things, a quantizer 232. Quantizer 232 receives $QP_{Output}$ and a corresponding decompressed video frame, and optimizes the video frame by applying quantization setting represented by $QP_{Output}$ to the encoding (compression) of the video frame. Then, video optimizer 108 outputs and transmits (204) the optimized-compressed video frame to a destination. Also, as an alternative to the configuration of video optimizer 108 shown in FIG. 2, quantizer 232 can be located external to encoder 230.

The video optimizer can process the incoming compressed video frames (202) one by one, and apply the above video quality-aware optimization process to each video frame on the fly and in a single pass. The video optimizer can be installed anywhere it is needed, and can apply the quality-aware video optimization whenever it is needed.

Figure 5:
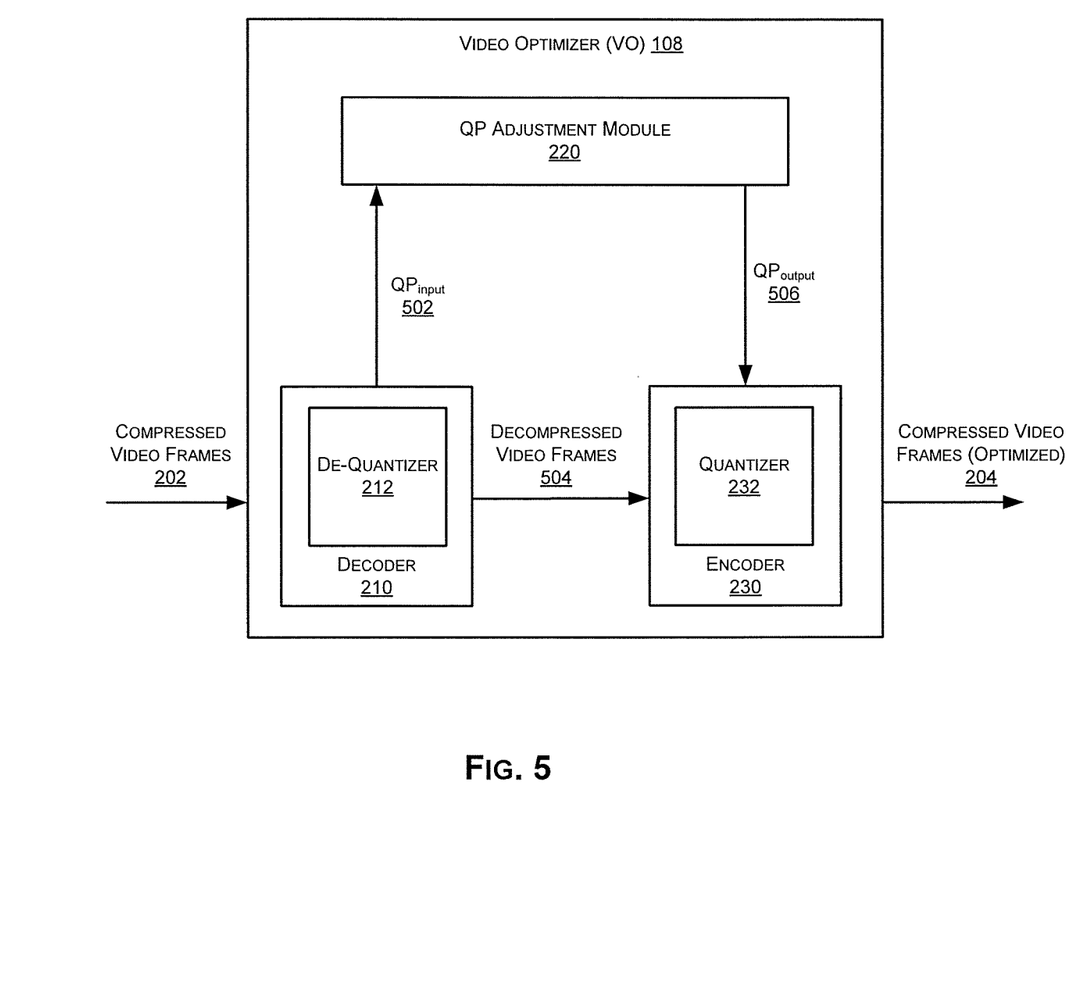
FIG. 5 is a functional diagram illustrating an exemplary process flow in the embodiment of FIG. 2.

FIG. 5 is a functional diagram illustrating an exemplary process flow in the embodiment of FIG. 2. Without departing from the exemplary embodiments, the exemplary process flow can be altered to delete steps, change the order of steps, or include additional steps.

After receiving (202) compressed video frames from a data network, video optimizer 108 can direct the compressed video frames to decoder 210. Decoder 210 can intercept and decode (decompress) an incoming compressed video frame. De-quantizer 212 of decoder 210 may extract from the decompressed video frame $QP_{Input}$, which was originally used for compressing the incoming compressed video frame. Decoder 210 or de-quantizer 212 may then pass (502) the extracted $QP_{Input}$ to QP adjustment module 220, and transfer (504) the decompressed video frame to encoder 230.

Based on the $QP_{Input}$, QP adjustment module 220 may convert $QP_{Input}$ from decoder 210's QP scale to encoder 230's QP scale, if the input compressed video frames (202) and the output compressed video frames (204) are in different compression formats (codecs). The conversion can be based on a mapping between QP scales for each combination of input codec and output codec that the quality-aware video optimizer supports. If the input codec is the same as the output codec, the $QP_{Input}$ may not be converted or the converted $QP_{Input}$ is the same as the $QP_{Input}$.

Also, in some embodiments, QP adjustment module 220 can acquire a quality degradation offset, indicating an amount of quality degradation, to control quality degradation introduced during the optimization of the decompressed video frame. A default value of the quality degradation offset can be set to zero, denoting that minimal quality degradation is introduced. The quality degradation offset can be obtained, for example, from a database containing, e.g., historical data analysis of optimized video. Based on the converted $QP_{Input}$ and the quality degradation offset, QP adjustment module 220 can compute ΔQP used to derive $QP_{Output}$ corresponding to the incoming $QP_{Input}$, and forward (506) $QP_{Output}$ to encoder 230.

After receiving (504, 506) the decompressed video frame and the corresponding $QP_{Output}$, quantizer 232 of encoder 230 optimizes the video frame by applying quantization setting indicated by $QP_{Output}$ to the encoding (compression) of the decompressed video frame. The optimization can include, for example, reducing byte size of the compressed video frames while attempting to retain the original perceptual quality of the compressed video frames. After the optimization, video optimizer 108 outputs and transmits (204) the optimized-compressed video frame to a destination, for example, user device 102.

Figure 6:
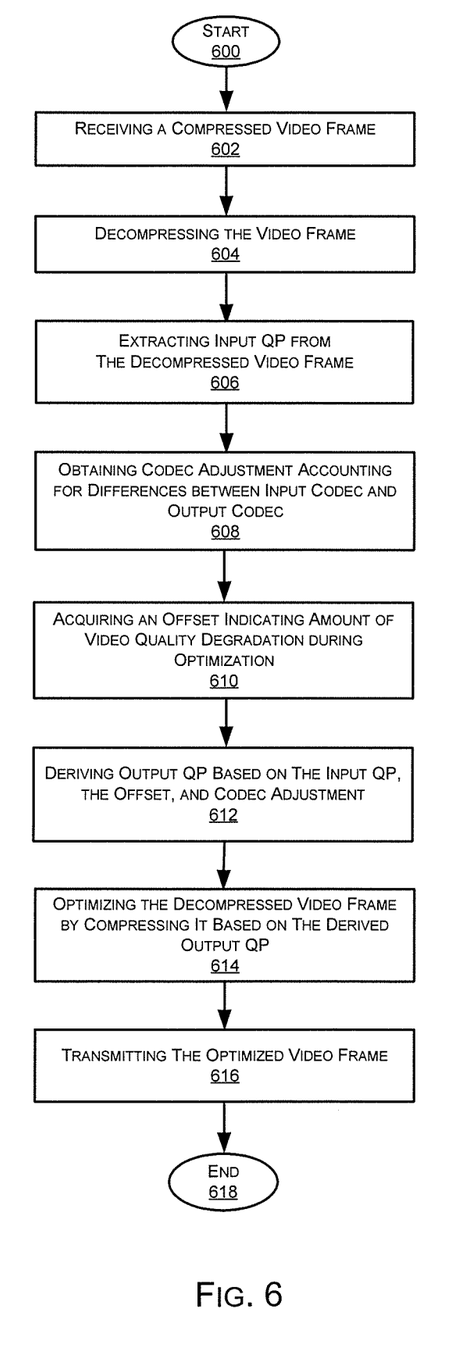
FIG. 6 is a flowchart representing an exemplary method of quality-aware video optimization.

FIG. 6 is a flowchart representing an exemplary method of quality-aware video optimization. Without departing from the exemplary embodiments, the exemplary process flow can be altered to delete steps, change the order of steps, or include additional steps.

After receiving (602) a compressed video frame, a video optimizer decodes (decompresses) (604) the video frame, and extracts (606) an input QP value from the decoded (decompressed) video frame. In addition, the video optimizer can obtain (608) a codec adjustment, which accounts for differences between the input and output compression formats (codecs). The video optimizer may perform this step based on a determination whether encoding codec (output video compression format) is different from decoding codec (input video compression format). If the input codec is the same as the output codec, the default value of the codec adjustment may be set to zero.

At step 610, the video optimizer may acquire a quality degradation offset, indicating amount of quality degradation, to control quality degradation introduced during optimization of the decompressed video frame. A default value of the quality degradation offset can be set to zero, if quality degradation is to be minimized. The quality degradation offset can be obtained based on, for example, analysis of historical data of optimized video. Based on the input QP, the codec adjustment, and the quality degradation offset, the video optimizer can compute a ΔQP. The ΔQP corresponds to the difference between the input QP and an output QP used for optimizing the decompressed video frame. The video optimizer can then derive (612) the output QP based on the ΔQP.

Alternatively, the video optimizer may convert the input QP value from decoding (input) QP scale to encoding (output) QP scale based on a determination that the encoding codec is different from the decoding codec. If the decoding codec is the same as the encoding codec, the input QP may not be converted or the converted input QP is the same as the input QP. Based on the converted input QP and the quality degradation offset, the video optimizer can compute a ΔQP and thus use the ΔQP to derive (612) an output QP for optimizing the decompressed video frame.

After having derived the output QP, the video optimizer can optimize (614) the decoded (decompressed) video frame by encoding (compressing) it based on quantization setting corresponding to the derived output QP. The optimization can modify the decompressed video frame so that the byte size of the compressed video frame is reduced as much as possible, while simultaneously limiting the perceptual quality degradation to a controllable level. The video optimizer can transmit (616) the optimized video frame to a destination. The method can then end (618).

Figure 7:
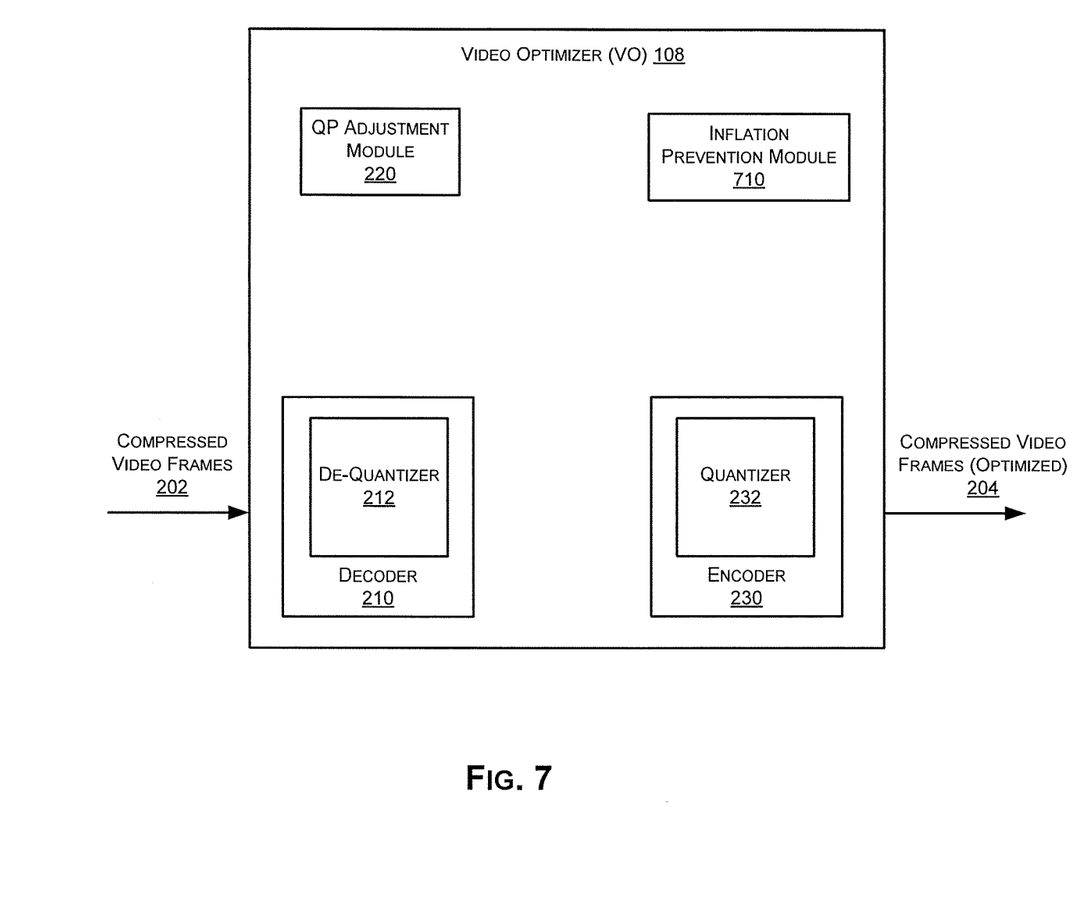
FIG. 7 is a block diagram illustrating another embodiment of an exemplary quality-aware video optimizer in the exemplary system of FIG. 1.

FIG. 7 is a block diagram illustrating another embodiment of an exemplary quality-aware video optimizer 108 in the exemplary system of FIG. 1. The system in FIG. 7 has similar components to those in FIG. 2, except that in FIG. 7, video optimizer 108 has an inflation prevention module 710 to compensate for byte size inflation that can be introduced during optimization. The illustrated configuration of video optimizer 108 in FIG. 7 is exemplary only, and can be modified to provide discrete elements or combine multiple elements into a single one, and be provided as any combination of hardware and software.

Quality-Aware Video Optimization: Applying Compression Feedback to Prevent Inflation A situation may arise where the $QP_{Input}$ values for at least some of the input video frames of a video stream (202) are high, and thus QP adjustment module 220 may choose negative $\Delta QP$ values for those frames to preserve the original perceptual quality of the video stream. High $QP_{Input}$ values indicate that the input video frames (202) have lost substantial information during their original compression. During quality-ware video optimization process, it is not desirable to further discard more information from the input video frames. QP adjustment module 220 can select negative $\Delta QP$ values used to derive low $QP_{Output}$ values, thus retaining the original perceptual quality of the video stream. Nevertheless, the negative $\Delta QP$ values and low $QP_{Output}$ values can inflate the byte size of the video stream. Although the degree of the byte size inflation would be small, it is usually not desirable to increase the byte storage requirement of the video stream.

Inflation prevention module 710 can utilize a feedback mechanism to adjust $\Delta QP$ value for any potential inflation. In some embodiments, for the video stream currently being processed, inflation prevention module 710 can utilize a compensation function that takes into consideration the total byte size of at least some video frames encoded thus far and the total byte size of at least some video frames decoded thus far. In some embodiments, for the video stream currently being processed, inflation prevention module 710 can utilize a compensation function that takes into consideration the total byte size of all video frames encoded thus far and the total byte size of all video frames decoded thus far. The compensation function can output a positive value to compensate for the byte size inflation. Inflation prevention module 710 can then further adjust the $\Delta QP$ value based on byte size inflation adjustment—the output of the compensation function—to preserve the original perceptual quality of the input video frames while avoiding or minimizing byte size inflation.

For each video frame to be encoded, the $\Delta QP$ can be calculated as, for example:

$$\Delta QP = F(QP_{Input}) + D + C(InputBytes, OutputBytes)$$

As previously described therein, F is a function disclosing correlation between $QP_{Input}$ and $\Delta QP$, and the parameter D is a quality degradation offset indicating the amount of quality degradation to be introduced during re-quantization. The function C is the compensation function. In some embodiments, the symbol InputBytes represents the total byte size of at least some frames previously decoded for a video stream currently being processed, and the symbol OuputBytes represents the total byte size of at least some frames previously encoded for the video stream currently being processed. In some embodiments, the symbol InputBytes represents the total byte size of all frames previously decoded for a video stream currently being processed, and the symbol OuputBytes represents the total byte size of all frames previously encoded for the video stream currently being processed. Video optimizer 108 may keep track of InputBytes and OuputBytes of a video frame stream currently being processed. InputBytes and OuputBytes can also be obtained from a database containing, e.g., total byte size of video frames encoded thus far and total byte size of video frames decoded thus far for the video frame stream currently being processed. If no byte size inflation occurs, the compensation function may output a zero value.

After QP adjustment module 220 having computed a $\Delta QP$ based on the $QP_{Input}$ and the quality degradation offset, inflation prevention module 710 can adjust the $\Delta QP$ based on the byte size inflation adjustment. Based on the adjusted $\Delta QP$, inflation prevention module 710 can then derive $QP_{Output}$ for optimizing the decompressed video frame being processed. In some embodiments, QP adjustment module 220 and inflation prevention module 710 can be combined into one component. The combined component can calculate the $\Delta QP$ based on the $QP_{Input}$, the quality degradation offset, and the byte size inflation adjustment, and further use the $\Delta QP$ to derive a $QP_{Output}$ for optimizing the decompressed video frame.

The rest of components function similarly to those provided above in FIG. 2. The inflation prevention mechanism can help retain the original perceptual quality of a video stream having lost substantial information during original compression, while reduce byte size of the video stream as much as possible.

Figure 8:
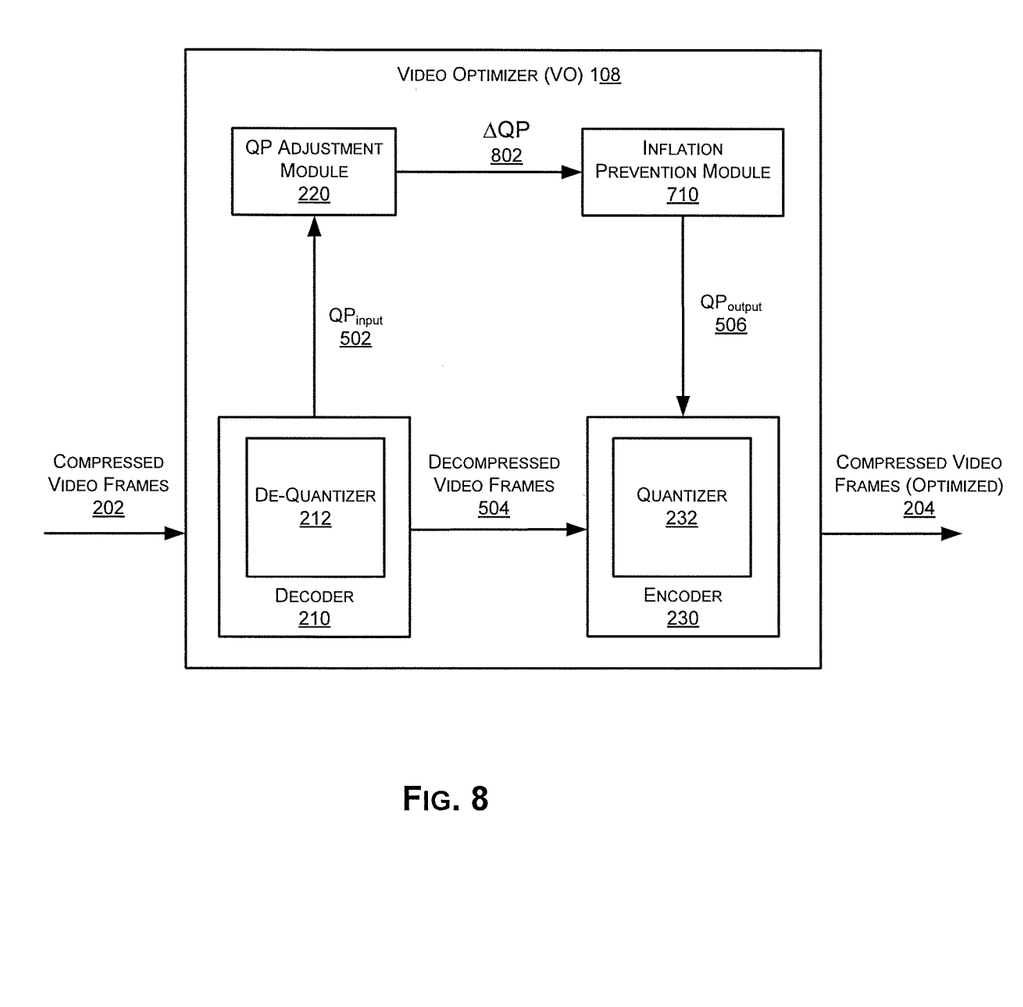
FIG. 8 is a functional diagram illustrating an exemplary process flow in the embodiment of FIG. 7.

FIG. 8 is a functional diagram illustrating an exemplary process flow in the embodiment of FIG. 7. The system in FIG. 8 has similar components to those in FIG. 5, except that in FIG. 8, video optimizer 108 provides inflation prevention module 710 to compensate for byte size inflation in computing $\Delta QP$. Without departing from the exemplary embodiments, the exemplary process flow can be altered to delete steps, change the order of steps, or include additional steps.

After having computed $\Delta QP$ for an input compressed video frame, QP adjustment module 220 provides (802) the computed $\Delta QP$ to inflation prevention module 710. Inflation prevention module 710 can retrieve historic byte size data or historic inflation data. The historic byte size data may include, for example, InputBytes (total byte size of all or some frames previously decoded for a video frame stream being currently processed) and OuputBytes (total byte size of all or some frames previously encoded for the video frame stream being currently processed) kept by video optimizer 108 or in a database. The historic inflation data may include, for example, byte size inflation that has been introduced during video optimization of some frames of a video frame stream being currently processed. Based on the historic byte size data or the historic inflation data, inflation prevention module 710 can estimate byte size inflation to be introduced during video optimization based on the $\Delta QP$ provided by QP adjustment module 220. Inflation prevention module 710 can then adjust the $\Delta QP$ by compensating for the estimated byte size inflation. The adjusted $\Delta QP$ can help retain the original perceptual quality of the input compressed video frame while reducing the byte size of the video frame as much as possible. Based on the adjusted $\Delta QP$, inflation prevention module 710 can derive a $QP_{Output}$ corresponding to an incoming $QP_{Input}$, and forward (506) the $QP_{Output}$ to encoder 230.

The rest of communication flow is similar to the communication flow provided above in FIG. 5.

Figure 9:
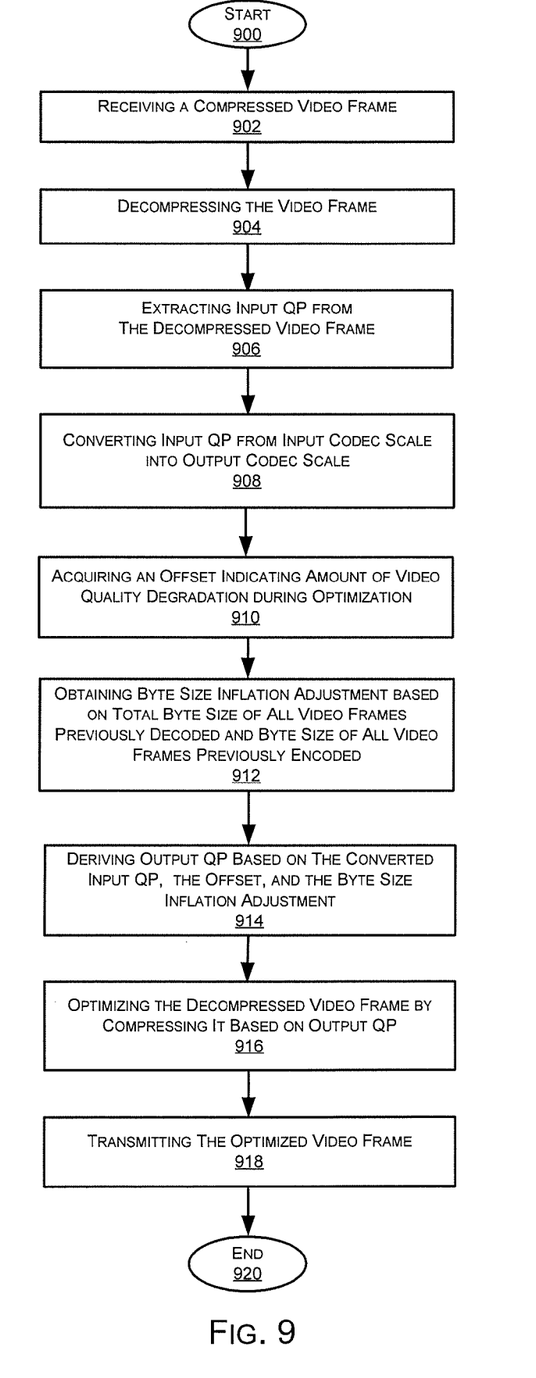
FIG. 9 is a flowchart representing another exemplary method of quality-aware video optimization.

FIG. 9 is a flowchart representing another exemplary method of quality-aware video optimization. Without departing from the exemplary embodiments, the exemplary process flow can be altered to delete steps, change the order of steps, or include additional steps.

After receiving (902) a compressed video frame, a video optimizer decodes (decompresses) (904) the video frame, and extracts (906) an input QP value from the decoded (decompressed) video frame. In addition, the video optimizer can convert (908) the input QP value from decoding QP scale to encoding QP scale, based on a determination that encoding codec (output video compression format) is different from decoding codec (input video compression format). The conversion accounts for differences between the input and output compression formats (codecs). If the encoding codec is the same as the decoding codec, the input QP value is not converted or the converted input QP value is the same as the input QP value.

At step 910, the video optimizer may also acquire a quality degradation offset, indicating the amount of quality degradation to be introduced during optimization of the decompressed video frame. A default value of the quality degradation offset can be set to zero, if quality degradation is to be minimized. The quality degradation offset can be obtained based on, for example, analysis of historical data of optimized video.

The video optimizer may further obtain (912) a byte size inflation adjustment based on historic data of a video stream currently being processed. The historic data can include historic byte size data or historic inflation data of the video stream. The historic byte size data may include, for example, total byte size of all or some frames previously decoded for the video stream, and total byte size of all or some frames previously encoded for the video stream. The historic inflation data may include, for example, byte size inflation that has been introduced during video optimization of some frames of a video frame stream being currently processed. In some embodiments, the historic data can be retrieved from a database. The byte size inflation adjustment can compensate for byte size inflation to be introduced during optimization of the decompressed video frame. If no byte size inflation is introduced, the default value of the byte size inflation adjustment can be set to zero.

Based on the converted input QP, the quality degradation offset, and the byte size inflation adjustment, the video optimizer can compute a $\Delta QP$. The $\Delta QP$ corresponds to the difference between the input QP and an output QP used for optimizing the decompressed video frame. The video optimizer can then derive (914) the output QP based on the $\Delta QP$.

Alternatively, the video optimizer may calculate a $\Delta QP$ based on the converted input QP and the quality degradation offset first, and then adjust the $\Delta QP$ based on the byte size inflation adjustment. Based on the adjusted $\Delta QP$, the video optimizer can derive (914) the output QP for optimizing the decompressed video frame.

After having derived the output QP, the video optimizer can optimize (916) the decoded (decompressed) video frame by encoding (compressing) it based on quantization setting corresponding to the derived output QP. The optimization can modify the decompressed video frame so that the byte size of the compressed video frame is reduced as much as possible, while simultaneously limiting the perceptual quality degradation to a controllable level. The video optimizer can transmit (918) the optimized video frame to a destination. The method can then end (920).

The methods disclosed herein may be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

A portion or all of the methods disclosed herein may also be implemented by an application specific integrated circuit (ASIC), a field-programmable gate array (FPGA), a complex programmable logic device (CPLD), a printed circuit board (PCB), a digital signal processor (DSP), a combination of programmable logic components and programmable interconnects, a single central processing unit (CPU) chip, a CPU chip combined on a motherboard, a general purpose computer, or any other combination of devices or modules capable of performing quality-aware video optimization disclosed herein.

In the preceding specification, the invention has been described with reference to specific exemplary embodiments. It will, however, be evident that various modifications and changes may be made without departing from the broader spirit and scope of the invention as set forth in the claims that follow. The specification and drawings are accordingly to be regarded as illustrative rather than restrictive. Other embodiments may be apparent to those skilled in the art from consideration of the specification and practice of the invention disclosed herein.

What is claimed is:

1. A computer-implemented method comprising:
   receiving an encoded video frame;
   decompressing the received encoded video frame;
   extracting a first quantization parameter (QP) from the decompressed video frame, wherein the first QP corresponds to quantization settings originally used for compressing the encoded video frame;
   acquiring a delta QP based on the first QP;
   acquiring an inflation adjustment based on a comparison between total byte size of frames previously decompressed and total byte size of the frames after being previously compressed, wherein the received encoded video frame and the frames previously decompressed are part of a sequence including a plurality of video frames;
   acquiring a second QP based on the delta QP, the first QP, and the inflation adjustment, wherein the second QP corresponds to quantization settings for compressing the decompressed video frame;
   compressing the decompressed video frame based on the acquired second QP; and
   providing the compressed video frame.

2. The method of claim 1, further comprising:
   determining whether a compression format of the received encoded video frame is different from a compression format to be used for compressing the decompressed video frame;

converting, based on the determination, the first QP from an input QP scale into an output QP scale, wherein the input QP scale corresponds to the compression format of the received encoded video frame, and the output QP scale corresponds to the compression format to be used for compressing the decompressed video frame; and acquiring the second QP based on the converted first QP and the delta QP.

3. The method of claim 2, wherein converting the first QP is further based on a mapping between the input QP scale and the output QP scale.

4. The method of claim 1, wherein acquiring the delta QP is further based on a mapping between the first QP and the delta QP.

5. The method of claim 1, wherein acquiring the delta QP comprises:
choosing, if a value of the first QP is below a threshold, a positive value for the delta QP.

6. The method of claim 1, wherein acquiring the delta QP comprises:
choosing, if a value of the first QP is above a threshold, a negative value for the delta QP.

7. The method of claim 1, further comprising:
acquiring a quality degradation offset for controlling amount of video quality degradation to be introduced during compression of the decompressed video frame; and
acquiring the second QP based on the quality degradation offset, the first QP, and the delta QP.

8. The method of claim 7, wherein acquiring the quality degradation offset can be based on analysis of historical data of compressed video.

9. The method of claim 7, wherein a default value of the quality degradation offset can be set to zero if minimal quality degradation is introduced during the compression.

10. A computer-implemented method comprising:
decompressing a received encoded video frame that is a part of a sequence including a plurality of video frames;
extracting a first quantization parameter (QP) from the decompressed video frame, wherein the first QP corresponds to quantization settings originally used for compressing the encoded video frame;
acquiring a delta QP based on the first QP;
acquiring an inflation adjustment based on a comparison between total byte size of frames previously decompressed and total byte size of the frames after being previously compressed, wherein the received encoded video frame and the frames previously decompressed are part of the sequence including a plurality of video frames;
acquiring a second QP based on the delta QP and the inflation adjustment, wherein the second QP corresponds to quantization settings for compressing the decompressed video frame; and
compressing the decompressed video frame based on the second QP.

11. The method of claim 10, wherein the inflation adjustment is further acquired based on historical data concerning the sequence including byte size inflation that has been introduced during compression of at least some of sequence frames.

12. The method of claim 10, wherein the historical data concerning the sequence includes byte size of at least some of sequence frames previously decompressed and byte size of the at least some of the sequence frames after previously being compressed.

13. A video optimizer comprising:
a decoder configured to decompress a received encoded video frame, wherein the decompressed video frame includes a first quantization parameter (QP) corresponding to quantization settings originally used for compressing the encoded video frame;
an inflation prevention module configured to acquire an inflation adjustment based on a comparison between total byte size of frames previously decompressed and total byte size of the frames after being previously compressed, wherein the received encoded video frame and the frames previously decompressed are part of a sequence including a plurality of video frames;
a QP adjustment module configured to obtain a delta QP based on the first QP, and to acquire a second QP based on the delta QP the first QP, and the inflation adjustment, wherein the second QP corresponds to quantization settings for compressing the decompressed video frame; and
an encoder configured to compress the decompressed video frame based on the second QP.

14. The video optimizer of claim 13, further comprising a de-quantizer configured to decompress the received encoded video frame and to extract the first QP from the decompressed video frame.

15. The video optimizer of claim 13, wherein the QP adjustment module is further configured to:
acquire compression format adjustment accounting for differences between a compression format of the received encoded video frame and a compression format to be used for compressing the decompressed video frame;
convert the first QP from an input QP scale into an output QP scale based on the compression format adjustment, wherein the input QP scale corresponds to the compression format of the received encoded video frame, and the output QP scale corresponds to the compression format to be used for compressing the decompressed video frame; and
obtain the second QP based on the converted first QP and the delta QP.

16. The video optimizer of claim 13, wherein the QP adjustment module is further configured to obtain the compression format adjustment from a database containing a mapping between the input QP scale and the output QP scale.

17. The video optimizer of claim 13, wherein the QP adjustment module is further configured to obtain the delta QP from a database containing a mapping between the first QP and the delta QP.

18. The video optimizer of claim 13, wherein the QP adjustment module is further configured to:
acquire a quality degradation offset for controlling amount of video quality degradation to be introduced during compression of the decompressed video frame; and
obtain the second QP based on the quality degradation offset and the delta QP.

19. The video optimizer of claim 18, wherein the QP adjustment module is further configured to acquire the quality degradation offset from a database containing historical data analysis of compressed videos.

20. The video optimizer of claim 13, further comprising a quantizer configured to compress the decompressed video frame by applying the quantization settings represented by the second QP to compression of the decompressed video frame.

21. A video optimizer comprising:
a decoder configured to decompress a received encoded video frame that is a part of a sequence of plurality of video frames, wherein the decompressed video frame includes a first quantization parameter (QP) corresponding to quantization settings originally used for compressing the encoded video frame;
a QP adjustment module configured to acquire a delta QP based on the first QP;
an inflation prevention module configured to acquire an inflation adjustment based on a comparison between total byte size of frames previously decompressed and total byte size of the frames after being previously compressed, wherein the received encoded video frame and the frames previously decompressed are part of a sequence including a plurality of video frames;
a QP adjustment module configured to acquire a second QP based on the delta QP and the inflation adjustment, wherein the second QP corresponds to quantization settings for compressing the decompressed video frame; and
an encoder configured to compress the decompressed video frame based on the second QP.

22. The video optimizer of claim 21, wherein the inflation adjustment is further acquired based on historical data concerning the sequence including byte size inflation that has been introduced during compression of at least some of sequence frames.

23. The video optimizer of claim 21, wherein the historical data concerning the sequence includes byte size of at least some of sequence frames previously decompressed and byte size of the at least some of the sequence frames after previously being compressed.

24. A non-transitory computer readable medium storing instructions that, when executed, cause a computer to perform a method for video optimization, the method comprising:
receiving an encoded video frame;
decompressing the received encoded video frame;
extracting a first quantization parameter (QP) from the decompressed video frame, wherein the first QP corresponds to quantization settings originally used for compressing the encoded video frame;
acquiring a delta QP based on the first QP;
acquiring an inflation adjustment based on a comparison between total byte size of frames previously decompressed and total byte size of the frames after being previously compressed, wherein the received encoded video frame and the frames previously decompressed are part of a sequence including a plurality of video frames;
acquiring a second QP based on the delta QP, the first QP, and the inflation adjustment, wherein the second QP corresponds to quantization settings for compressing the decompressed video frame;
compressing the decompressed video frame based on the second QP; and
providing the compressed video frame.

25. A non-transitory computer readable medium storing instructions that, when executed, cause a computer to perform a method for video optimization, the method comprising:
decompressing a received encoded video frame that is a part of a sequence of plurality of video frames;
extracting a first quantization parameter (QP) from the decompressed video frame, wherein the first QP corresponds to quantization settings originally used for compressing the encoded video frame;
acquiring a delta QP based on the first QP;
acquiring an inflation adjustment based on a comparison between total byte size of frames previously decompressed and total byte size of the frames after being previously compressed, wherein the received encoded video frame and the frames previously decompressed are part of the sequence including a plurality of video frames;
acquiring a second QP based on the delta QP and the inflation adjustment, wherein the second QP corresponds to quantization settings for compressing the decompressed video frame; and
compressing the decompressed video frame based on the second QP.

\* \* \* \* \*